United States Patent Office 3,576,027
Patented Apr. 20, 1971

3,576,027
HYDROSILATION OF OLEFINS
John Gaylord Fish, Garland, Tex., assignor to Texas Instruments Incorporated, Dallas, Tex.
No Drawing. Filed July 31, 1968, Ser. No. 748,942
Int. Cl. C07f 7/08, 7/18
U.S. Cl. 260—448.2
4 Claims

ABSTRACT OF THE DISCLOSURE

Platinum-silane catalyst compositions suitable for hydrosilation of olefins are prepared by reacting crystalline chloroplatinic acid with an organic silane or siloxane to form a stable but highly reactive platinum-silane composition. The contact of olefins with this composition results in rapid addition of the organic silane or siloxane thereto.

---

This invention relates to the hydrosilation of olefins. In another aspect, this invention relates to a novel method of preparing platinum-silane catalyst compositions. In a further aspect, this invention relates to a novel method of adding silanes or siloxanes to olefins.

Organic silanes or siloxanes are useful intermediates for the production of silicones by reactions which are basic to silicone technology. Particularly important for this purpose are the alkyl silanes.

It is commonly known in the art that hydrosilanes will add to olefins to yield alkyl silanes. Lukevits and Voronkov, Organic Insertion Reactions of Group IV Elements, Consultants Bureau, New York (1966). Various methods for carrying out this addition reaction include thermal, photochemical, radio-chemical, free radical catalysis, and with various metallic catalysts from Groups I–VIII, particularly platinum supported on charcoal.

Perhaps the most common and highly effective hydrosilation technique was disclosed by Speier et al. and J. Am. Chem. Soc. 79,974 (1957), and involves the use of chloroplatinic acid. According to this technique, chloroplatinic acid is initially dissolved in isopropyl alcohol to form a solution which is then admixed with the olefin. After this, the hydrosilane is slowly added to the olefin and chloroplatinic acid solution to give the desired product. An induction period follows the addition of the hydrosilane, which in turn is followed by a rapid exotherm when reaction begins. Generally, after the reaction proceeds to 30–50% completion, the catalysts decreases in activity and additional amounts of chloroplatinic acid must be added periodically to the reaction mixture. Thus, even though the Speier technique is generally more efficient than other prior art catalytic procedures, such as the use of platinum supported on charcoal, the catalytic reactivity decreases rather sharply after the reaction has begun thereby requiring the use of relatively large amounts of the valuable platinum catalyst.

One object of this invention is to provide an improved method of hydrosilation of olefinic compounds utilizing chloroplatinic acid wherein catalyst activity is not decreased substantially before the completion of the reaction.

Another object of this invention is to provide a novel method of preparing a platinum-silane platinum-siloxane catalyst.

According to the invention, a platinum-silane platinum-siloxane catalyst composition is prepared by reacting crystalline chloroplatinic acid with a suitable organic hydrosilane, organic hydrosiloxane, or hydropolysiloxane to form a stable but highly activated platinum-silane platinum-siloxane composition. The contact of this composition with an olefinic compound results in a highly effective addition of the hydrosilane hydrosiloxane or hydropolysiloxane thereto.

The chloroplatinic acid can be added to the organic hydrosilane, organic hydrosiloxane, or organic hydropolysiloxane either in its solid crystalline form $$(H_2PtCl_6 \cdot 6H_2O)$$

or as an aqueous paste, or a saturated aqueous solution thereof.

Generally the organic hydrosilanes, organic hydrosiloxanes or organic hydropolysiloxanes which do not reduce the platinum in the chloroplatinic acid to the zero valence state can be used in the practice of this invention. A preferred group of organic hydrosilanes, organic hydrosiloxanes, and organic hydropolysiloxanes are represented by the general formulas:

(I)

and (II)

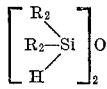

wherein $R_1$ is selected from hydrogen, chlorine, bromine, iodine, and the following organic radicals having from 1–18 carbon atoms: alkyl, alkenyl, alkynyl, cycloalkyl, cycloalkenyl, aralkyl, alkyoxy, carbonyl, carboalkoxy, and the halogen substituted derivatives thereof; and wherein $R_2$ is selected from hydrogen and the following organic radicals having from 1–18 carbon atoms, alkyl, alkenyl, alkynyl, cycloalkyl, cycloalkenyl and aralkyl; and wherein at least one R group in each molecule is an organic radical. Examples of these organic hydrosilanes, organic hydrosiloxanes and organic hydropolysiloxanes include methyldichlorosilane, ethyldichlorosilane, propyldichlorosilane, butyldichlorosilane dimethylmonochlorosilane, diethylmonochlorosilane, dipropylmonochlorosilane, dibutylmonochlorosilane, dinonylmonochlorosilane, methylethylmonochlorosilane, methylpropylmonochlorosilane, methylpentylmonochlorosilane, methyldecylmonochlorosilane, methyldibromosilane, methyldiodosilane, methylpropylmonobromosilane, propylnonylmonobromosilane, dimethyloxymethylsilane, diethoxymethylsilane, dimethylhexoxysilane, diacyloxy methylsilanes, tetramethyldisiloxane, tetraethyldisiloxane, tetraoctyldisiloxane, trimethyldisiloxane and the like and mixtures thereof.

The more preferred organic hydrosilanes are the alkyldihalosilanes, and the dialkylmonohalosilanes of Formula I disclosed above.

The above described hydrosilanes, organic hydrosiloxanes and organic hydropolysiloxanes can be added to olefins containing from 1–28 carbon atoms and having one or more olefinic bonds according to the process of this invention. Examples of suitable olefinic compounds include ethylene, propylene, butenes, pentenes, hexenes, heptenes, octenes, nonenes, decenes, undecenes, dodecenes, tridecenes, tetradecenes, pentadecenes, hexadecenes, heptadecenes, octadecenes, nonodecenes, octacosenes, butadienes, pentadienes, hexadienes, octadienes, the alkoxy, carboxy and carboalkoxy substituted derivatives thereof, mixtures and the like.

The platinum-silane catalysts of this invention are prepared by initially admixing the hydrosilane hydrosiloxane or hydropolysiloxane with the crystalline chloroplatinic acid. The mole ratio of chloroplatinic acid to hydrosilane is in the range of from about 0.01:1 to about 0.0001:1, and conveniently from about 0.001:1. Initially no color change occurs in the generally water-white hydrosilane, hydrosiloxane or hydropolysiloxane when it is mixed with the red-brown chloroplatinic acid, but a slow evolution of gas (mostly hydrogen and HCl) results. After several hours, generally from 1 to 3 hours, the solution will turn to a yellowish hue. A period of time (generally from 2 to 6 hours) after the solution has turned to a yellowish hue, it will turn to a darker hue (generally a yellow-green to deep reddish hue depending on the particular silane). This darker colored solution is a relatively stable yet highly reactive coordination composition, particularly suitable as a hydrosilation catalyst composition. It is to be noted that neither the crystalline chloroplatinic acid nor the intermediate yellowish colored solution is catalytically active. This procedure should be carried out in an inert atmosphere such as nitrogen and in the absence of oxygen. Also, this preparation procedure is preferably carried out in room temperature and atmospheric pressure, but higher and lower values can be used as long as the silane is maintained in the liquid state.

The hydrosilation addition reaction can be carried out with conventional equipment and techniques. The reaction can be conveniently conducted in a batch process wherein the platinum-silane platinum-siloxane catalyst composition is added to a stirred reactor containing the olefinic material. It is generally preferred that the mole ratio of olefin to silane be at least 1:1. Thus, additional amounts of the organic silane can be added to the olefin with the platinum-silane platinum-siloxane composition to yield the desired olefin to silane ratio. It is preferred that the reaction be conducted under an inert atmosphere such as nitrogen. If desired, the reaction can be initiated by applying heat thereto, but the reaction should take place under temperature and pressure conditions which will maintain the olefinic compound and hydrosilane, hydrosiloxane, or hydropolysiloxane in the liquid state.

Generally, it is preferred that both the catalyst preparation steps and the subsequent addition steps be conducted in the absence of diluents, since most diluents such as benzene and toluene may inhibit the reactions.

A better understanding of the invention can be obtained by referring to the following illustrative examples, which are not intended, however, to be unduly limitative of the invention.

EXAMPLE I

Methyldichlorosilane was reacted with $H_2PtCl_6 \cdot 6H_2O$ to form a reactive coordination hydrosilation catalyst composition in the following manner. A few crystals of the chloroplatinic acid (red-brown in color) were added to a reaction vessel, and then approximately 1 milliliter of the water-white methyldichlorosilane was poured over the crystals in the vessel. The vessel was flushed with nitrogen, and capped with a closure having a drying tube extending therethrough.

A reaction immediately occurred which resulted in the evolution of gas, and the reaction vessel was allowed to set at room temperature. Two hours after the reaction had begun, the silane solution remained water-white but gas evolution was still occurring. A portion of this water-white solution was removed and added to an approximately equal portion of n-hexene. No reaction occurred between the white solution and olefin.

Three hours after the reaction had begun the solution had begun to turn a pale yellow, and gas was still evolving therefrom. A portion of this pale yellow solution was removed and added to an approximately equal portion of n-hexene. No reaction occurred between the yellow solution and the olefin.

Between 3 and 5 hours after the reaction had begun the solution had turned a burgundy-red color. A portion of this red solution was removed and mixed with an approximately equal portion of n-hexene to give an immediate exothermic reaction wherein the methyldichlorosilane added to the n-hexene.

This test procedure was successfully carried out with various silanes and olefins, some of which are illustrated in the following examples. Only two silanes were found to be inoperative. The inorganic trichlorosilane reacted with the chloroplatinic acid to yield a yellow inactive complex. Also, tri-t-butoxysilane reacted with the chloroplatinic acid to yield a gelatinous precipitate suspended in the solution which was inactive as a hydrosilation catalyst.

EXAMPLE II

In this run, 0.336 part by weight of $H_2PtCl_6 \cdot 6H_2O$ was added to a reaction vessel similar to the one used in Example I. Subsequently, the crystals were covered with approximately 1.4 parts by weight of dimethylmonochlorosilane. The reactor contents were allowed to set at room temperature for three days. During this period, a red-brown solution had formed. The solution was then filtered, and unreacted dimethylmonochlorosilane was evaporated in a stream of nitrogen to give a dark viscous solution. A portion of this dark viscous solution was added to an approximate equal molar mixture of methyldichlorosilane and 1-octene. After a 10 second induction period, a vigorous reaction resulted wherein the methyldichlorosilane was added to the 1-octene.

Thus, the reactive coordination composition of this invention is relatively stable when maintained under an atmosphere of nitrogen, and can be stored for several days.

EXAMPLE III

In this run, 0.119 part by weight of $H_2PtCl_6 \cdot 6H_2O$ was placed in a reactor equipped with a stirrer and a reflux condenser, and 216 parts by weight of dimethylmonochlorosilane were added thereto.

The solution was allowed to set for several hours (overnight), during which time it had turned red-brown in color. At this time, the colored silane solution was added dropwise to 160 parts by weight of diethylene glycol divinyl ether $(CH_2CH-O-CH_2-CH_2)_2O$ at room temperature. No reaction occurred after the addition of about 50 parts by weight of the complex solution. Next, the reactor was heated to approximately 110° C. at which temperature exothermic reaction occurred and the temperature rose to 135° C. The exothermic reaction continued for approximately 30 minutes to complete the addition of the dimethylmonochlorosilane to the olefin. Thus, with the more complex and longer chain olefinic materials, the exothermic reaction can be initiated by heating.

EXAMPLE IV

A reactor similar to the one used in Example I was charged with 0.374 part by weight of an aqueous chloroplatinic acid paste ($H_2PtCl_6 \cdot xH_2O$ wherein $x$ is greater than 6). Subsequently, 500.5 parts by weight of methyl dichlorosilane were placed into the reaction vessel thereby covering the chloroplatinic paste. The reaction mixture was allowed to stand for several hours (overnight) at room temperature to yield a burgundy colored composition. Next, 1018.7 parts by weight of octadecene were heated to 82° C. and the burgundy composition was added slowly thereto for a period of 2.5 hours while the temperature of the octadecene was maintained at a value between 100 and 120° C. After the addition of the burgundy colored solution was completed, the reaction mixture was maintained at 110° C. for several hours.

The resulting reaction mixture was vacuum distilled, and 1306.2 parts by weight of octadecylmethyldichlorosilane ($C_{16}H_{37}SiCH_3Cl_2$) was recovered at 0.15 mm. Hg and 163.5° C., which is an 89.7% yield based upon the theoretical amount of octadecene charged.

Thus, this example illustrates the advantage of using the reactive coordination composition of this invention over prior art methods which utilize chloroplatinic acid wherein reactivity decreases during the course of the reaction, and more chloroplatinic acid must be periodically added to the reaction mixture. The reactive coordination composition of this invention not only acts as the addition catalyst, but always assures an adequate and effective supply of catalyst at low concentrations.

EXAMPLE V

A reactor similar to the one used in Example IV was charged with approximately one part by weight of $H_2PtCl_6 \cdot 6H_2O$, and 114 parts by weight of methyldiethoxysilane. After several hours the solution had turned a yellow-green. This yellow-green solution was then slowly added to 77.8 parts by weight of 1,1-dimethoxy-2-propene while the reaction mixture was maintained at 50° C. The resulting mixture was maintained at 50° C. for several hours (overnight), and then the mixture was distilled under vacuum and 131.5 parts by weight of addition product was recovered at 50–51° C. and 0.05–0.06 mm. Hg. This was a yield of 73% methyldiethoxy-3,3-dimethoxypropylsilane.

Thus, this example illustrates that not only will the dialkoxy substituted silanes function in this invention, but they will also add to alkoxy substituted olefins.

Various other hydrosilane, hydrosiloxanes, and hydropolysiloxanes and oxygen substituted olefinic compounds can be used in the practice of this invention, for example, the procedure of Example V was used except that tetramethyldisiloxane was originally reacted with the chloroplatinic acid to yield a reactive coordination composition. This reactive coordination composition was reacted with ethylundecenoate to give an 87% yield of 1,23-dicarbethoxy - 12,12,14,14 - tetramethyl - 13 - oxa-12,14-disilatricosane.

What is claimed is:
1. A method comprising the steps of:
reacting crystalline chloroplatinic acid with an organic silicon compound selected from the group consisting of methyldichlorosilane, methyldiethoxysilane, and tetramethyldisiloxane to produce a reactive coordination composition, and
contacting said composition with an olefinic compound selected from the group consisting of octadecene, 1,1 - dimethoxy-2-propene and ethyl undecenoate, thereby adding the organic silicon compound to the olefinic compound.

2. The method of claim 1 wherein said organic hydrosilane is methyldichlorosilane and said olefinic compound is octadecene.

3. The method of claim 1 wherein said organic hydrosilane is methyldiethoxysilane and said olefinic compound is 1,1-dimethoxy-2-propene.

4. The method of claim 1 wherein said organic siloxane is tetramethyldisiloxane and said olefinic compound is ethyl undecenoate.

References Cited

UNITED STATES PATENTS

| | | | |
|---|---|---|---|
| 3,404,169 | 10/1968 | Gaignon et al. | 260—448.2(E) |
| 3,419,593 | 12/1968 | Willing | 260—448.2(E) |
| 3,453,233 | 7/1969 | Flatt | 260—448.2X |

JAMES E. POER, Primary Examiner
P. F. SHAVER, Assistant Examiner

U.S. Cl. X.R.
260—448.8R